United States Patent [19]

Alexander

[11] Patent Number: 4,938,623
[45] Date of Patent: Jul. 3, 1990

[54] LOCKING DEVICE

[75] Inventor: Larry G. Alexander, Indianapolis, Ind.

[73] Assignee: Leads Metal Products, Inc., Indianapolis, Ind.

[21] Appl. No.: 371,621

[22] Filed: Jun. 26, 1989

[51] Int. Cl.⁵ .................. F16B 7/06; F16G 11/12
[52] U.S. Cl. ................................ 403/45; 403/46; 403/165; 403/305; 403/379; 280/304.1
[58] Field of Search .............. 403/43, 45, 46, 48, 403/118, 361, 305, 379, 164, 165; 280/304.1; 81/124.4, 124.5; 29/175 R; 410/145, 146, 147, 148; 292/262, 288, 339

[56] References Cited

U.S. PATENT DOCUMENTS

| 925,901 | 6/1909 | Hardick | 403/46 |
| 2,352,585 | 6/1944 | Camburn | 403/46 |
| 2,678,225 | 5/1954 | Wright | 403/46 |
| 2,900,203 | 8/1959 | Hayden | 29/175.1 X |
| 3,719,377 | 3/1973 | Schultz et al. | 29/175.1 X |

FOREIGN PATENT DOCUMENTS

| 342683 | 10/1921 | Fed. Rep. of Germany | 403/46 |
| 610203 | 3/1935 | Fed. Rep. of Germany | 403/46 |
| 254324 | 12/1948 | France | 403/46 |
| 731796 | 6/1955 | United Kingdom | 403/46 |

OTHER PUBLICATIONS

Everest and Jennings, International, 1987 Catalog, "Lifestyles", p. 18.

Primary Examiner—Randolph A. Reese
Assistant Examiner—Franco S. DeLiguori
Attorney, Agent, or Firm—Robert A. Spray

[57] ABSTRACT

A locking bar for blocking relative movement of movable parts of a device, particularly providing anti-theft nature to devices such as wheelchairs which would probably be manipulated to a collapsed condition as an incident to a theft of the device; and anti-theft nature is especially provided by the locking bar made to appear to be merely a non-removable axle, yet made shortenable for removal, and thus chair-collapsability by authorized personnel, by an internal sliding operativity which is concealed but which achieves length-changing be engagement of screw-threaded parts to permit manual torque-application to movable parts to achieve the length-changing, the sliding member being a socket whose sliding into or from its length-changed position is effected merely by tilting to achieve positioning by gravity.

12 Claims, 2 Drawing Sheets

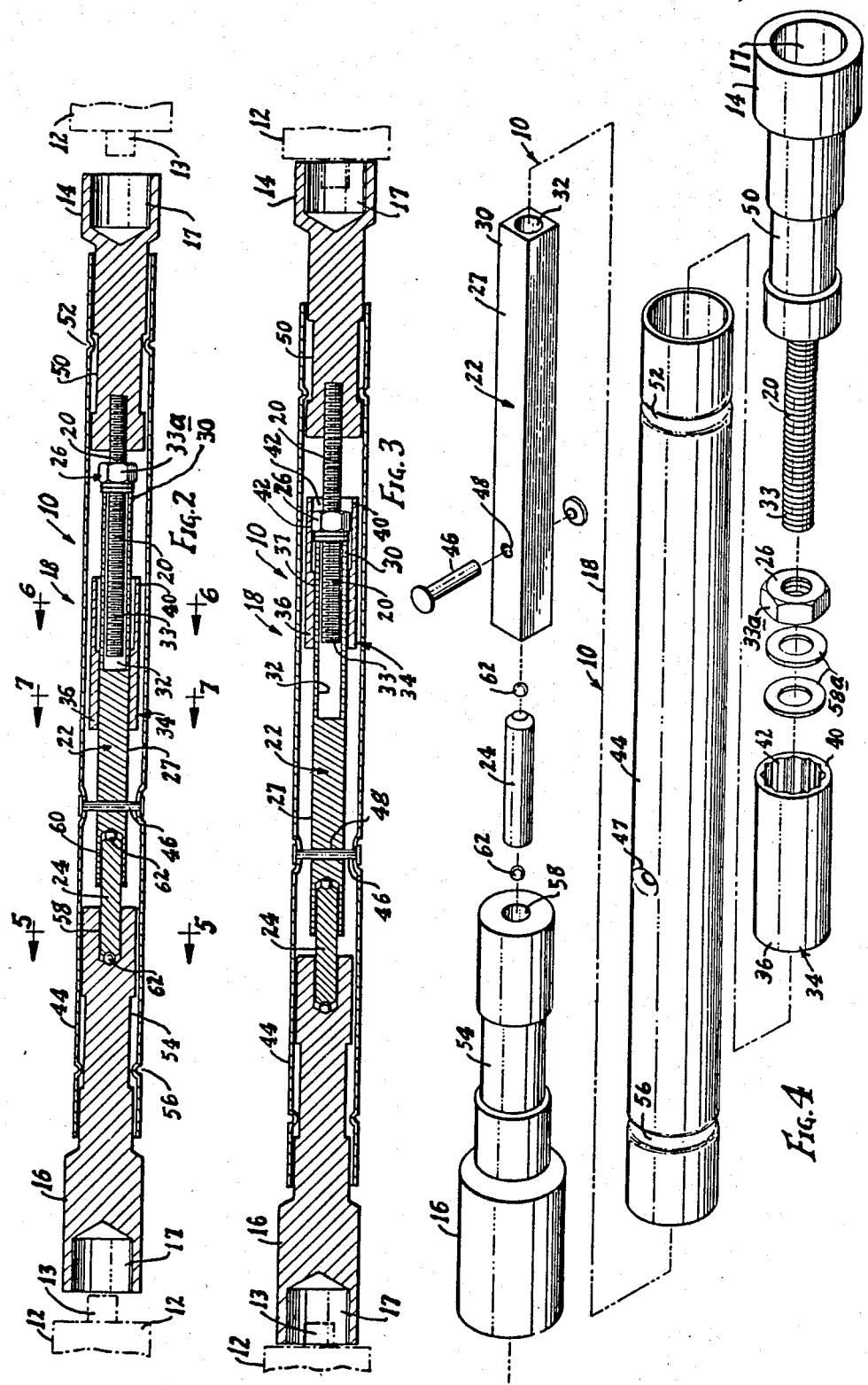

1

LOCKING DEVICE

FIELD OF THE INVENTION

The present invention relates to a locking device, particularly for objects such as wheelchairs whose collapsability or "fold-up" nature for ease of transport during non-use involves a lessening of the distance between components of the object.

Objects such as wheelchairs, which have an "unfolded" condition for their use, but a "folded" or "fold-up" condition for transport, have long been realized to be easy and lucrative targets for thieves; for not only are they significantly valuable, but their desired collapsable nature permits them in periods of non-use to be collapsed by a thief into a fairly compact condition which permits their easy loading into the thief's vehicle.

A particular situation of wheelchair thievery is that of hospitals, for when non-ambulatory patients are being dismissed to be taken away from the hospital by a relative, often the hospital lends a wheelchair to the relative, who wheels the patient to a waiting vehicle and then leaves the wheelchair in the parking lot or along the street; and although a hospital could avoid probably most of the thievery, as by prompt retrieval of the used wheelchair, and/or by sending a hospital attendant to push the patient to the pick-up vehicle, such anti-theft procedures have disadvantages of cost, inefficiency of labor use, etc.

The thievery problem as to wheelchairs is likely to be accentuated in large hospitals, due to the distance of any patrol personnel from the place the wheelchairs are left, the quantity of such wheelchair loans, etc.

The prior art has not only recognized the problem of wheelchair thievery, it has attempted to solve it by installing a locking bar onto the chair; however, as shown herein, the prior art embodiments do not provide the particular features of this invention. Thus for easier consideration of the novel features and the significance of the special concepts of the present invention, comparisons and contrasts to the prior art will be set forth and hopefully be helpful.

SUMMARY OF THE INVENTION

The present invention provides a novel and effective way of minimizing wheelchair thefts, by novel locking means which prevent the wheelchair from being collapsed, yet the invention permits easy collapsability of the wheelchair to an authorized person.

Quite in contrast to prior art attempts of locking devices for wheelchairs, the present invention hopefully discourages thievery by making it a mystery how the locking bar could be removed for chair-collapsability, and a mystery as to what sort of tooling would be required.

The invention also has the advantages that it is easily affixed to the wheelchair, and during legitimate periods of wheelchair use poses no difficulty of use, or unattractiveness. It is quite inconspicuous, for it appears to be just an axle of the chairs' wheels; and as another advantage, it requires no change of most existing wheelchairs, and, on the contrary, it utilizes the axle already present for the large wheelchair wheels of most wheelchairs, as a connection site.

More particularly, the invention provides a length-changeable bar member adapted at each end to be fitted over the existing axle of the respective wheelchair wheel, and while the bar is thus installed it blocks against any collapsability; but, quite hidden from view, the axle-appearing bar is provided with means which prevent it from being subsequently shortened even though during assembly of the axle bar onto the wheelchair the axle bar is lengthened through that same span of shortening distance which is needed for disassembly.

Still more particularly, the invention provides the axle bar to be of a plurality of components, two of which are screw-threaded components which are threaded to provide for length-changing, and others which are of such a nature to provide that the wheelchair must be given a certain orientation before disassembly torque may be applied to the screw members just mentioned.

The prior art does not show the inventive concepts, even-though the prior arts as to wheelchairs and other two-condition devices are surely of long-known and widespread knowledge, and their devices are quite simple as to mechanical nature, quite open to any persons' inspection, quite easy to understand, etc.:

The prior arts as to wheelchairs and other two-condition devices are surely long known as to use and knowledge, even though the basic nature of wheelchairs as to their collapsability apparently has not basically changed in significant respects of the nature here involved.

The universality and age-old knowledge and use of collapsable wheelchairs is so unquestionable, and since the acts of using, collapsing and unfolding wheelchairs are such easily-observed procedures, and since probably a majority of all persons have personally participated in such uses, the prior art non-origination of particularly the present combination of concepts and features is surely here to be recognized realistically as more non-obvious than many improvements would likely be in most other fields of endeavor.

The prior art's awareness of the problem of wheelchair thievery, and of the step of attaching a locking bar being desirable as a theft-prevention by blocking against a fold-up step, and the prior art's step of even making a locking bar which, like that of the present invention, serves to block a fold-up of the wheelchair, all contribute to show the nature and significance of the present concepts as inventive, not having been obvious features of improvements, yet quite advantageous.

With this background, the significance of the combination of concepts of the present invention is to be considered by taking these factors into realistic consideration; i.e., the long use of devices in these fields, coupled with their mechanical simplicity, their openness to observation, their easy understandability by all persons, etc., which surely all combine to indicate that creativity of significantly novel articles or devices in this field has been in fact non-obvious to an unlimited number of persons for a great number of years.

This general non-creativity as to basic changes has been in spite of minor or superficial changes as to these devices over the years; and such changes, e.g., as size, shape, adornment, covers, etc., apparently for obvious reasons, emphasize the lack of the world's creativity to the basic nature improvements here conceived, for which a patent award is deserved.

In a hindsight consideration of the present invention's concepts to determine its inventive and novel nature of the invention as a whole, it is not only conceded but emphasized that the prior art had multiple details of length-change features which could have been usable in this invention, but only if the prior art had had the guidance of the present concepts of the present invention; and even though theft-avoidance (here in spite of easy collapsability by an authorized person)seems to be a matter of increasing significance, especially since better quality has meant more value of wheelchairs, and increasing labor costs have meant that thefts of wheelchairs are not being avoided by closer supervision of wheelchair use, the prior art has long had much motivation as to apparatus of the present invention.

Further, it is emphasized that the prior art has had several particulars of prior art ability and motivation which individually and accumulatively help show the non-obviousness of this combination invention as to its various features:

Forming and shaping procedures and know-how as to objects of metal, knowledge of combination articles, knowledge of length-changeability of members, knowledge of use of screwthreads for adjusting length, knowledge of non-circular nature of an object's periphery as providing for its rotatability, knowledge of a control member having an actuation position and a non-actuation position, provision of a transverse bar which prevents wheelchair fold-up, etc.

With the reality of all these factors, the inventive non-obviousness of the present invention is quite manifest.

The prior art has had features of the present invention, and approaches to its concepts, but not in the combination by which the invention as a whole is advantageously achieved:

The background of prior art as just summarized seems more significant in showing the non-obviousness of the present concepts when also it is reminded that the prior art also had long provided and long used principles of combination articles and combination concepts as to many types of devices, and the prior art long realized that combination was quite desirable in various devices, for a variety of uses; and metal-shaping and other material-forming and other manufacturing procedures are well known by which all components of the present invention could have been made, if the prior art had had the specific concepts of the invention.

Collapsability is long known as to not only wheelchairs but to many other articles of furniture, light vehicles such as baby cabs, etc.

And as to wheelchairs in particular, it is quite apparent that collapsability involves a coming together of the large wheels.

And the existence of articles embodying length-change of various features is not only conceded, it is emphasized; for as to the novelty here of the combination, of the invention as considered as a whole, a contrast to the prior art helps show both the great variety of the various prior art attempts of improvement, and the advantages and the inventive significance of the present concepts. Thus, as shown herein as a contrast to all the prior art, the inventive significance of the present concepts as a combination is emphasized, and the nature of the concepts and their results can perhaps be easier understood.

The nature of the present invention in terms of its distinctions over the prior art may also be seen even more realistically as non-obvious, by a consideration of what is probably the least remote of the prior art, which is a commercial device sold by an international company which specializes in wheelchairs and their device being advertised as an "Anti-theft Device" for wheelchairs, and as an attachment installed onto the wheelchairs' back posts for the specifically-expressed purpose of to "prevent the wheelchair from being folded."

That prior art is by Everest and Jennings, International, 3233 East Mission Oaks Boulevard, Camarillo, Calif. 93010, Phone: (805) 987-6911; and the anti-theft device is shown in its 1987 catalog "Lifestyles" on page 18. (A copy of that p. 18, with the single photo and paragraph of text hi-lited, is being filed with the Patent Office file of this case.)

Quite significantly, the Everest and Jennings device shows no concept of its wheel-spacer bar as being a supposed axle by being co-axial with the chair wheel's axles, and it does not show any concept of special maneuverability to achieve length-change. Further, it shows no concept of concealed components able to give length-changing operativity, and, quite to the contrary, it shows attach-onto type of connectors, with connector-components which are not only quite visible but quite of a nature whose disassembly would be quite apparent to anyone carrying even the simplest of hand tools.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art shows an approach to the overall invention, of particularly many types and styles of wheelchairs, and has used length-change features to members of various articles, and the prior art has shown various natures of all such articles, it is significant that none of the prior art shows the novel and advantageous combination, which provides the merits of this invention, even though certain details are shown separately from this accomplishment.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art of all relevant fields.

BRIEF DESCRIPTION OF THE DRAWINGS

The above description of the novel and advantageous invention is of somewhat introductory and generalized form. More particular details, concepts, and features are set forth in the following and more detailed description of illustrative embodiment, reference being had to the accompanying generally diagrammatic and schematic drawings, iu which:

FIGS. 2 and 3, in much larger scale, are axial cross-sectional views of the locking bar device, these two views of FIGS. 2 and 3 being respectively as follows, with parts of the wheelchair's own axle parts being shown fragmentally in chain lines, and with the two views (FIG. 2 and FIG. 3) adjacent one another on the drawing sheet to emphasize the contrasting conditions of the sliding socket member in relation to the control nut; and in these views:

FIG. 2 shows the parts in a first condition in which the slidable socket is in a first condition in which it is not operatively engaging the control nut, and thus the first (here rightward) one of the end bodies is freely rotatable with respect to the second (here leftward) end body and the connector, this FIG. 2 view showing the locking bar in a relatively short-length condition and in a length-controlled condition before providing the length-changeable condition of the device as shown in FIG. 3, this FIG. 2 condition having been achieved by the user having dipped the left end downward to have released the socket member from its operative (FIG. 3) engagement of the nut member;

FIG. 3 shows the parts in a second condition, i.e., in a relatively long-length condition of the bar against the chairs' wheel axles, after the user in installing the locking bar has dipped the right end of the locking bar downward to have caused the socket member to have slid into a second condition here shown, i.e., a position of operative engagement of the nut member so that rotation of the connector sleeve, relatively to the right end body, will achieve a length-change of the locking bar device, either longer or shorter, depending on whether the task is assembly or dis-assembly, either type of length-change being achievable in this FIG. 3 condition of the socket member, by achieving a relative rotation of the nut member and the right end body's threaded rod, thus in a dis-assembly task to enable the locking bar to be removed from the wheelchair and thus permit foldup of the wheelchair by no longer the locking bar being held in its lengthened condition (FIG. 3) in which it is locking apart the wheel axles of the wheelchair.

FIG. 4 is a so-called "exploded view" of the locking bar device, illustrating pictorially its various components.

DETAILED DESCRIPTION OF THE ILLUSTRATIVE EMBODIMENT

Figure 5:
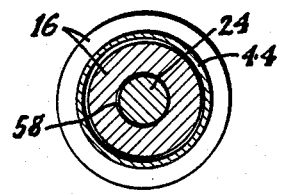
FIGS. 5, 6 and 7 are transverse cross-sectional views, respectively as taken by section-lines 5—5, 6—6, and 7—7, of FIG. 1.

As shown in the drawings, the present invention provides a combination device having special features and special function, as a locking bar device 10 here shown for locking a wheelchair 12 against being "folded-up" to a compact or transport condition.

Figure 1:
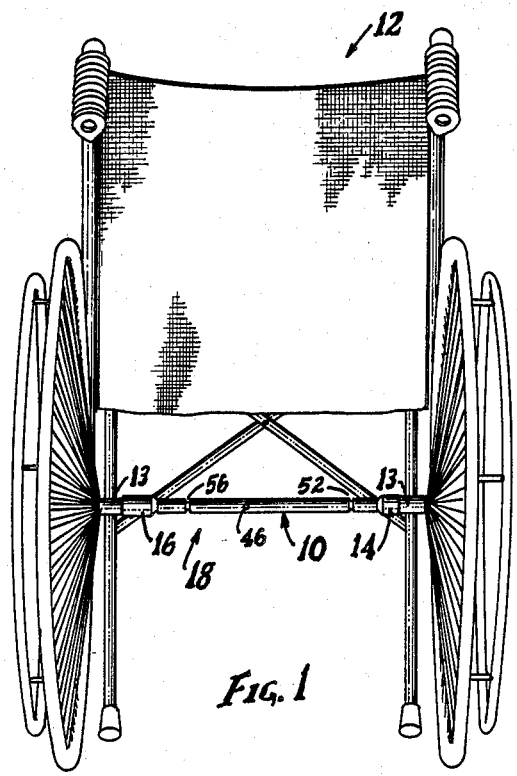
FIG. 1 is an elevation view of a wheelchair, with a locking bar of the present invention assembled onto the wheel axles of the chair with the outward end of the end bodies of the device sleeved over the wheel axle of each of the chair wheels, this view showing the two end bodies and their intermediate connector in elevation view; however, in this external view it is to be noticed that one cannot tell the condition of the locking bar, i.e., whether its socket member is a position controlling the condition of the locking bar as to whether it can or cannot be manipulated to achieve bar-length shortening to permit the bar removal needed to permit fold-up of the chair.

The bar 10 has special and concealed components, although to a person not knowing of its secrets of construction and operativity, the bar 10 would appear merely as the bar 10 shown in FIGS. 1 and 3, i.e., a bar which is merely an interconnecting part of the chair's wheel-axles 15, being supposedly an axle having no chair-collapse operativity or function, and having a first end (right in FIGS. 1–4) body 14 and a second end (left in FIGS. 1–4) body 16, with connector means 18 connecting the first end body 14 and the second end body 16 in a co-axial relationship.

The end bodies 14/16 are movably related, as herein set forth, this description showing the construction and special operativity concepts which provide the different conditions providing changeability and non-changeability of the bar length; and although both end bodies 14 and 16 have large recesses 17 extending axially outwardly for ease of fitting over the two chair axles 13 and against the wheelchair components 12 in the axle area, in the assembled state (FIG. 3) such recesses are not visible.

The connector means 18, quite different from merely an axle bar, comprises a screw threaded rod means 20 carried by the first end body 14 and fixed non-rotatably with respect thereto, the threaded rod 20 extending (leftwardly here) from the first end body 14 toward the second body means 16.

Also, the connector means 18 includes a socket carrier rod means 22 which may be a part of or fixed to the second end body 16, or for assembly ease includes at least (as shown in FIGS. 2 and 3) a rod 24 which operatively abuts against the second end body 16, such that movement of the second end body 16 relatively toward the first end body 14 would produce a movement of the socket carrier rod means 22 relatively toward the first end body 14, that relative movement of the rod means 22 toward the first end body 14 being blocked, however, by a nut means 26 as herein detailed, for anti-theft purposes.

Figure 6:
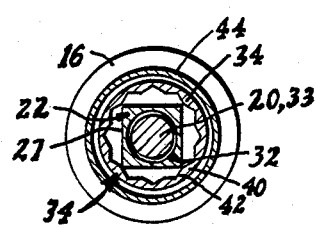
Figure 7:
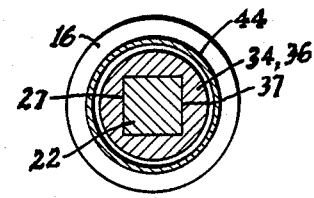

It is to be noticed that the socket carrier rod means 22 has a non-circular outer surface 27 (FIGS. 4, 6, and 7), and is provided, axially inwardly of its end 30 (here the right end) which is most adjacent the first end body 14 with an axial bore or hole 32 which freely receives the free end 33 (here the left end) of the screw threaded rod means 20.

The nut means 26 mentioned above is threaded onto the screw threaded rod means 20; and the nut means 26 has a non-circular periphery 33a whose function in bar 10's length-changing operativity is by co-operativity with a hollow socket member 34 which is axially and slidably sleeved or disposed around the socket carrier rod means 22.

More particularly as to the socket member 34 and its function, it is provided that a first end 56 (left in the drawings), that end 36 being the socket-end 36 most adjacent the second end body 16, is provided to have a non-circular bore 37 (FIG. 7) such as to accommodate that slidability of the socket 34, but making the socket member 34 and the socket carrier rod means 22 non-rotatable with respect to one another.

This non-rotatability of socket 34 relatively to carrier rod 22 and the second (left here) end body 16 exists in both of the conditions of the bar 10's components with respect to changeability or non-changeability of the bar 10's length.

Also, it is to be noticed that the socket member 34, on what is here called its second end 40, that end 40 being the end of the socket 54 (here the rightward end) which is most adjacent the first end body 14; has a non-circular bore 42 such as to co-operate with the nut means 26's periphery 33a to make the socket member 34 and the nut means 26 non-rotatable with respect to one another when in axial alignment or registry (FIG. 3 in contrast to FIG. 2).

More particularly, the slidability of the socket member 34 with respect to the socket carrier rod means 22 is such that they are relatively movable (FIG. 2) in and between what may be called a first condition in which the second end 40 of the socket member 34 is not operatively engaging the nut means 26 to make them relatively non-rotatable, and a second condition (FIG. 3) in which the second end 40 of the socket member 34 is operatively engaging the nut means 26's periphery 33a to make the socket 34 and nut 26 relatively non-rotatable.

The second (FIG. 3) condition exists when the socket 34 is sufficiently close to the first end body 14 that the socket's non-circular (right-ward) bore 42 is in axial registry with the nut 26; and thus in that condition, but only in that condition, any torque imparted to the socket carrier 22 will rotate the nut 26 relatively to threaded rod 20.

There is a sleeve 44 sleeved or disposed around the first end body 14, the second end body 16 and the connector means 18; and a transverse connection means is provided in the form here of a pin 46 passing through sleeve-holes 47 and a transverse hole 48 in the rod means 22, which interconnects the sleeve 44 and the socket carrier rod means 22, locking the sleeve 44 and the socket carrier rod means 22 against both axial and rotational relative movement.

Thus, anti-theft nature is provided, by the parts not permitting turning of the nut 26 for bar 10's length-control unless the parts ar in the so-called second condition; because the length of the overall device 10, from the outer end of the two end bodies 14/16, is defined by where the nut means 26 is located along the screw threaded rod means 20, for the engagement of the nut means 26 and the end 30 of the socket carrier rod means 22 most adJacent the first end body 14 limits the amount of closeness of the first end body 14 and second end body 16.

This provides that torque effort applied to either the second end body 16 or the sleeve 44 is not operative to relatively rotate the nut means 26 for changing its axial position on the screw threaded rod means 20 unless the socket member 34 is in its FIG. 3 position, i.e., the said second condition as herein explained.

Not necessarily apparent from schematic drawings, it should be realized that the device 10 is provided with open clearances between relatively moving parts, such that the slidability of the socket member 34 between its position of first condition (FIG. 2) and second condition (FIG. 3) is free so to be accomplishable merely by orienting the device 10 such that the socket member 34 can freely slide or move into and between its positions, i.e., first condition and second condition, merely by gravity, and by whatever small amount of rotation is needed merely to operatively engage the nut means' periphery.

Desirably as shown, the first end body 14 is provided with a reduced diameter portion 50, and an adjacent portion of the inner wall of the sleeve 44 is provided with an abutment lug means 52 extending into the reduced diameter portion 50 of the first end body 14, that reduced diameter portion 50 being of an elongated nature relatively to the abutment lug means 52 for accommodating relative axial travel of the sleeve 44 and first end body 14. The other (left as shown) end of the device 10 is similarly provided, at 54 and 56, respectively; and, desirably as shown, abutment lugs 52/56 are provided as an inwardly and circumferentially continuous bead, formed after the parts are assembled, and thus additionally making the device theftproof.

As mentioned, the socket carrier rod 22 is not shown as integral with the second end body 16; but they are blocked against any length-shortening by the bar 24. The bar 24 is held by co-axial bores 58 and 60 in the second end body 16 and the socket carrier 22, respectively; and ease of motion is aided by a spherical bearing ball 62 at the inner end of each of the bores 58 and 60, and by washers 58a on the threaded rod 20 between the end 30 of the carrier rod 22 and the nut means 26.

SUMMARY AND UTILITY DESIGNATIONS

A combination device as here presented provides concepts economical yet quite worthy theft discouragement as to articles such as collapsable wheelchairs, by simply yet effectively preventing their change of condition to that of a folded-up article which could be readily loaded into a thief's vehicle, and particularly by the characteristic of internal control components by which the condition-change operativity is wholly concealed and made visually undeterminable to unauthorized persons.

And although mechanically simple, the concept of a length-held brace member, for preventing the collapsability usually needed as a part of a wheelchair-theft procedure, is a concept which has eluded all the prior art; and this has been so, even though no aspect of mechanism operativity is probably more universally apparent than length-change effects and/or controls for mechanisms, as here shown as to a locking bar for wheelchairs, providing a special effect of non-collapsability unless the user knows the operative secret.

CONCLUSION

It is thus seen that a locking bar device, as provided and used according to the inventive concepts herein set forth, provides novel concepts of a desirable and advantageous device, yielding advantages especially as an anti-theft invention for wheelchairs, the invention having advantageous details and features, which, in overall combination, are conceptually different from the prior art articles even though various objects embodying certain of the mechanical details as a basic capability have of course been known for years; yet significantly this particular combination, even considered as including or building on prior art concepts, has not been suggested by the prior art, this achievement being a substantial and advantageous departure from prior art, all this even though the prior art shows attempts at improvement and variations as to wheelchair for many years. And particularly is the overall difference from the prior art significant when the non-obviousness is viewed by a consideration of the subject matter as a whole, as integrally incorporating a combination of features as different from the prior art, in contrast to merely those details of novelty themselves, and further in view of the prior art teaching away from the particular and inter-related concepts and features of the present invention, and the prior art having apparently been blind to the advantages of a locking bar for wheelchairs, and particularly its concealment of length-changeability of the locking bar.

In summary as to the nature of these advantageous concepts, their inventiveness is shown by novel features of concept and construction shown here, in novel and advantagous combination, not only being different from all the prior art known, but because the achievement is not what is or has been suggested to those of ordinary skill in the art, especially realistically considering this as comprising components which individually are similar to what is well known to manufacturers of wheelchairs of various and other condition-changing devices for many years. No prior art has suggested the modifications of any prior art to achieve the novel concepts here achieved, with the various features providing their own functions in the overall combination.

Accordingly, it will thus be seen from the foregoing description of the invention according to this illustrative embodiment, considered with the accompanying drawings, that the present invention provides new and useful concepts of a novel and advantageous locking invention, yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

I claim:

1. A locking bar device, comprising:
   a first end body and a second end body, each having an outer end and an inner end;
   connector means connecting the first end body and the second end body in a co-axial relationship, although movably related, as herein specified;
   the connector means comprising a screw threaded rod means carried by the first end body, and non-rotatable with respect thereto, and extending toward the second end body;
   the connector means also comprising a socket carrier rod means abuttingly associated with the second end body such that movement of the second end body relatively axially toward the first end body would produce a movement of the socket carrier rod means relatively axially toward the first end body;
   the socket carrier rod means having two ends, a first one of which is the one which is most adjacent the first end body, and having a non-circular outer surface, and is provided, axially inwardly of the said first end, with an axial hole which freely receives the screw threaded rod means;
   a nut means threaded onto the screw threaded rod means, and having a non-circular periphery;
   a hollow socket member slidably disposed around the socket carrier rod means and having a first end, directed toward the second end body, including a non-circular bore such as to permit relative sliding but inhibit relative rotation with the socket carrier rod means;
   the socket member having a second end directed toward the first end body including a non-circular bore such as to co-operate with the nut means periphery to make the socket member and the nut means non-rotatable with respect to one another;
   the slidability of the socket member with respect to the socket carrier rod means being such that they are relatively movable into and between a first condition in which the second end of the socket member is not operatively engaging the nut means to make them relatively non-rotatable, and a second condition in which the second end of the socket member is operatively engaging the nut means to make them relatively non-rotatable with respect to one another, the second condition being that in which the socket member is positioned such that the second end of the socket member is sufficiently close to the first end body that the socket member is in torque transmittable registry with said nut means;
   and a sleeve disposed around the first end body, the second end body, and the connector means;
   a transverse connection means interconnecting the sleeve and the socket carrier rod means;
   the length of the locking bar device being dependent upon where the nut means is located along the screw threaded rod means, the engagement of the nut means and said first end of the socket carrier rod means limiting the amount of closeness of the first end body and second end body;
   all the above thereby providing that torque effort applied to either the second end body or the sleeve is not operative to relatively rotate the nut means for changing its axial position on the screw threaded rod means unless the socket member is in its position of the said second condition, in which case torque imparted to the sleeve will do so, by transmission of torque through the transverse connection means, the socket carrier rod means, and the socket member.

2. The invention as set forth in claim 1, in which the device is provided with open clearances such that the slidability of the socket member between its position of the first condition and second condition is free so to be accomplishable merely by orienting the device such that the socket member can move into and between its positions of first condition and second condition merely by gravity and a small amount of rotation merely to operatively engage the nut means periphery for torque transmittance.

3. The invention as set forth in claim 2, in which the first end body is provided with a reduced diameter portion, and an adjacent portion of the inner wall of the sleeve is provided with an abutment lug means extending into the said reduced diameter portion of the first end body, the said reduced diameter portion being of an elongated nature relatively to the said abutment lug means, thereby accommodating relative axial travel of the sleeve and first end body.

4. The invention as set forth in claim 1, in which the first end body is provided with a reduced diameter portion, and an adjacent portion of the inner wall of the sleeve is provided with an abutment lug means extending into the said reduced diameter portion of the first end body, the said reduced diameter portion being of a elongated nature relatively to the said abutment lug means, thereby accommodating relative axial travel of the sleeve and first end body.

5. A locking bar device, comprising:
   a first end body and a second end body, each having an outer end and an inner end;
   connector means connecting the first end body and the second end body in a co-axial relationship, although movably related, as herein specified;
   the connector means comprising a screw threaded rod means carried by the first end body, and non-rotatable with respect thereto, and extending toward the second end body;
   the connector means also comprising a socket carrier rod means abuttingly associated with the second end body such that movement of the second end body relatively axially toward the first end body would produce a movement of the socket carrier rod means relatively axially toward the first end body;

the socket carrier rod means having two ends, a first one of which is the one which is most adjacent the first end body, and having a non-circular outer surface, and is provided, axially inwardly of the said first end, with an axial hole which freely receives the screw threaded rod means;

a nut means threaded onto the screw threaded rod means, and having a non-circular periphery;

a hollow socket member slidably disposed around the socket carrier rod means and having a first end, directed toward the second end body, including a non-circular bore such as to permit relative sliding but inhibit relative rotation with the socket carrier rod means;

the socket member having a second end directed toward the first end body including a non-circular bore such as to co-operate with the nut means periphery to make the socket member and the nut means non-rotatable with respect to one another;

the slidability of the socket member with respect to the socket carrier rod means being such that they are relatively movable into and between a first condition in which the second end of the socket member is not operatively engaging the nut means to make them relatively non-rotatable, and a second condition in which the second end of the socket member is operatively engaging the nut means to make them relatively non-rotatable with respect to one another, the second condition being that in which the socket member is positioned such that the second end of the socket member is sufficiently close to the first end body that the socket member is in torque transmittable registry with said nut means;

and a sleeve disposed around the first end body and the connector means;

at least one of the sleeve and second end body being operatively connected to the socket carrier rod means for imparting rotation thereto;

the length of the locking bar device being dependent upon where the nut means is located along the screw threaded rod means, the engagement of the nut means and said first end of the socket carrier rod means limiting the amount of closeness of the first end body and second end body;

all the above thereby providing that torque effort applied to either the second end body or the sleeve is not operative to relatively rotate the nut means for changing its axial position on the screw threaded rod means unless the socket member is in its position of the said second condition.

6. The invention as set forth in claim 5, in which the device is provided with open clearances such that the slidability of the socket member between its position of the first condition and second condition is free so to be accomplishable merely by orienting the device such that the socket member can move into and between its positions of first condition and second condition merely by gravity and a small amount of rotation merely to operatively engage the nut means periphery for torque transmittance.

7. The invention as set forth in claim 6, in which the first end body is provided with a reduced diameter portion, and an adjacent portion of the inner wall of the sleeve is provided with an abutment lug means extending into the said reduced diameter portion of the first end body, the said reduced diameter portion being of an elongated nature relatively to the said abutment lug means, thereby accommodating relative axial travel of the sleeve and first end body.

8. The invention as set forth in claim 5, in which the first end body is provided with a reduced diameter portion, and an adjacent portion of the inner wall of the sleeve is provided with an abutment lug means extending into the said reduced diameter portion of the first end body, the said reduced diameter portion being of an elongated nature relatively to the said abutment lug means, thereby accommodating relative axial travel of the sleeve and first end body.

9. A locking bar device, comprising:

a first end body and a second end body, each having an outer end and an inner end;

connector means connecting the first end body and the second end body in a co-axial relationship, although movably related, as herein specified;

the connector means comprising a screw threaded rod means carried by the first end body, and non-rotatable with respect thereto, and extending toward the second end body;

the connector means also comprising a socket carrier rod means abuttingly associated with the second end body such that movement of the second end body relatively axially toward the first end body would produce a movement of the socket carrier rod means relatively axially toward the first end body;

the socket carrier rod means having two ends, a first one of which is the one which is most adjacent the first end body, and having a non-circular outer surface, and is provided, axially inwardly of the said first end, with an axial hole which freely receives the screw threaded rod means;

a nut means threaded onto the screw threaded rod means, and having a non-circular periphery;

a hollow socket member slidably disposed around the socket carrier rod means and having a first end, directed toward the second end body, including a non-circular bore such as to permit relative sliding but inhibit relative rotation with the socket carrier rod means;

the socket member having a second end directed toward the first end body including a non-circular bore such as to co-operate with the nut means periphery to make the socket member and the nut means non-rotatable with respect to one another;

the slidability of the socket member with respect to the socket carrier rod means being such that they are relatively movable into and between a first condition in which the second end of the socket member is not operatively engaging the nut means to make them relatively non-rotatable, and a second condition in which the second end of the socket member is operatively engaging the nut means to make them relatively non-rotatable with respect to one another, the second condition being that in which the socket member is positioned such that the second end of the socket member is sufficiently close to the first end body that the socket member is in torque transmittable registry with said nut means;

and a sleeve disposed around the screw threaded rod means, the socket carrier rod means, and the socket member;

and the sleeve extending axially far enough to conceal the screw threaded rod means, the socket carrier rod means, and the socket member in and between their positions in both the first condition and the second condition;

at least one of the sleeve and second end body being operatively connected to the socket carrier rod means for imparting rotation thereto;

the length of the locking bar device being dependent upon where the nut means is located along the screw threaded rod means, the engagement of the nut means and said first end of the socket carrier rod means limiting the amount of closeness of the first end body and second end body;

all the above thereby providing that torque effort applied to either the second end body or the sleeve is not operative to relatively rotate the nut means for changing its axial position on the screw threaded rod means unless the socket member is in its position of the said second condition.

10. The invention as set forth in claim 9, in which the device is provided with open clearances such that the slidability of the socket member between its position of the first condition and second condition is free so to be accomplishable merely by orienting the device such that the socket member can move into and between its positions of first condition and second condition merely by gravity and a small amount of rotation merely to operatively engage the nut means periphery for torque transmittance.

11. The invention as set forth in claim 10, in which the first end body is provided with a reduced diameter portion, and an adjacent portion of the inner wall of the sleeve is provided with an abutment lug means extending into the said reduced diameter portion of the first end body, the said reduced diameter portion being of an elongated nature relatively to the said abutment lug means, thereby accommodating relative axial travel of the sleeve and first end body.

12. The invention as set forth in claim 9, in which the first end body is provided with a reduced diameter portion, and an adjacent portion of the inner wall of the sleeve is provided with an abutment lug means extending into the said reduced diameter portion of the first end body, the said reduced diameter portion being of an elongated nature relatively to the said abutment lug means, thereby accommodating relative axial travel of the sleeve and first end body.

* * * * *